United States Patent [19]
Yoshida et al.

[11] Patent Number: 5,592,715
[45] Date of Patent: Jan. 14, 1997

[54] WIPER BLADE FOR AUTOMOTIVE OUTSIDE MIRROR WIPER AND AUTOMOTIVE OUTSIDE MIRROR WIPER USING SAME

[75] Inventors: Norio Yoshida; Masayuki Yokota, both of Isehara, Japan

[73] Assignee: Ichikoh Industries, Ltd., Tokyo, Japan

[21] Appl. No.: 344,715

[22] Filed: Nov. 18, 1994

[30] Foreign Application Priority Data

| Nov. 19, 1993 | [JP] | Japan | 5-290590 |
| Apr. 26, 1994 | [JP] | Japan | 6-088681 |
| Apr. 26, 1994 | [JP] | Japan | 6-088682 |

[51] Int. Cl.$^6$ ............................ B60S 1/56; B60S 1/38
[52] U.S. Cl. ........................... 15/250.003; 15/250.48; 15/250.361; 15/250.38; 15/250.32; 359/507; 359/838; 359/871
[58] Field of Search ............... 15/250.002, 250.361, 15/250.37, 250.38, 250.39, 250.4, 250.41, 250.003, 250.001, 245, 250.19, 250.42; 359/507, 871, 838, 844

[56] References Cited

U.S. PATENT DOCUMENTS

| 2,607,066 | 8/1952 | Morton | 15/250.38 |
| 2,659,097 | 11/1953 | Morton | 15/250.38 |
| 2,896,245 | 7/1959 | Hopponen | 15/250.36 |
| 3,072,947 | 1/1963 | Bryant | 15/250.002 |
| 3,086,239 | 4/1963 | Peras | 15/250.36 |
| 3,135,004 | 6/1964 | Naigraw | 15/250.003 |
| 3,139,644 | 7/1964 | Smith | 15/250.36 |
| 3,447,187 | 6/1969 | Barrett | 15/250.16 |
| 3,902,218 | 9/1975 | Bryant | 15/250.002 |
| 4,369,542 | 1/1983 | Tamura et al. | 15/250.003 |

FOREIGN PATENT DOCUMENTS

| 470493 | 1/1951 | Canada | 15/250.36 |
| 144563 | 6/1985 | European Pat. Off. . | |
| 2148756 | 4/1973 | Germany | 15/250.002 |
| 4215109 | 7/1993 | Germany . | |
| 86656 | 4/1991 | Japan | 15/250.003 |
| 281647 | 1/1929 | United Kingdom | 15/250.19 |

*Primary Examiner*—Gary K. Graham
*Attorney, Agent, or Firm*— Foley & Lardner

[57] ABSTRACT

The wiper blade according to the present invention consists of a blade lever and a wiping string held as extended tight on one side of the blade lever. The height of the wiper blade is a maximum of a sum of a thickness of plate-like blade lever, outside diameter of the wiping string and the spacing between the blade lever and wiping string. The width of the wiper blade is that of the blade lever. Therefore, the wiper blade can be designed small as a whole. The mirror holder has formed thereon a wiper blade guide consisting of as ascending slope to lift away from the mirror surface the wiper blade having been moved to near its reverse position and a vertical wall to land the wiper blade, having been thus lifted and reversed, from the lifted position above the mirror surface onto the mirror surface to a predetermined position where the wiper blade starts being moved back. Thus, the wiper blade can jump over a rainwater it has gathered by its forward movement and wipes it again along with new raindrops by its reverse movement with no trailing, during the reverse movement, of the rainwater having been gathered downward once by the forward movement, thereby permitting to effectively wipe away raindrops on the mirror surface.

15 Claims, 14 Drawing Sheets

F I G. 16
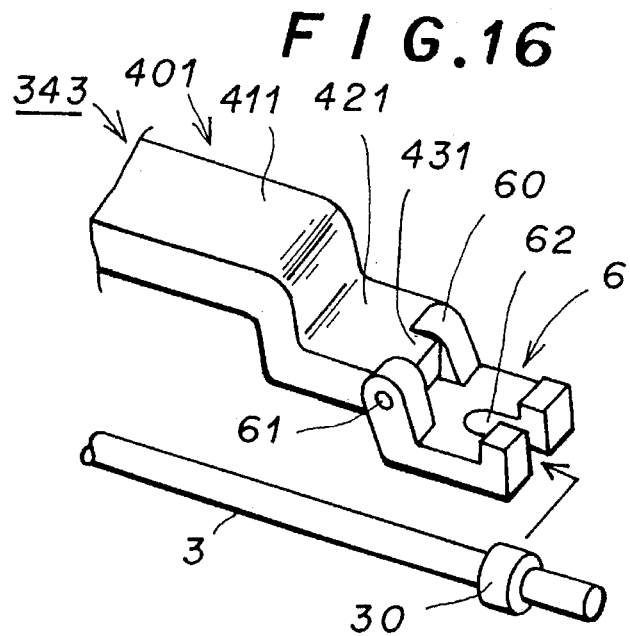
F I G. 17
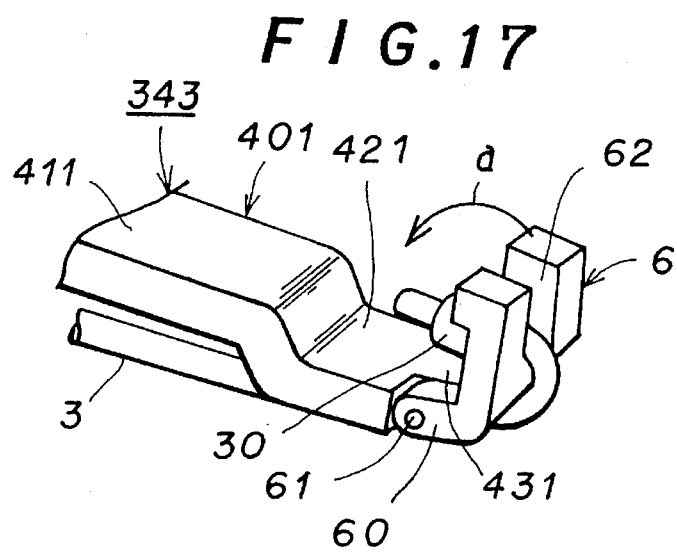
F I G. 18
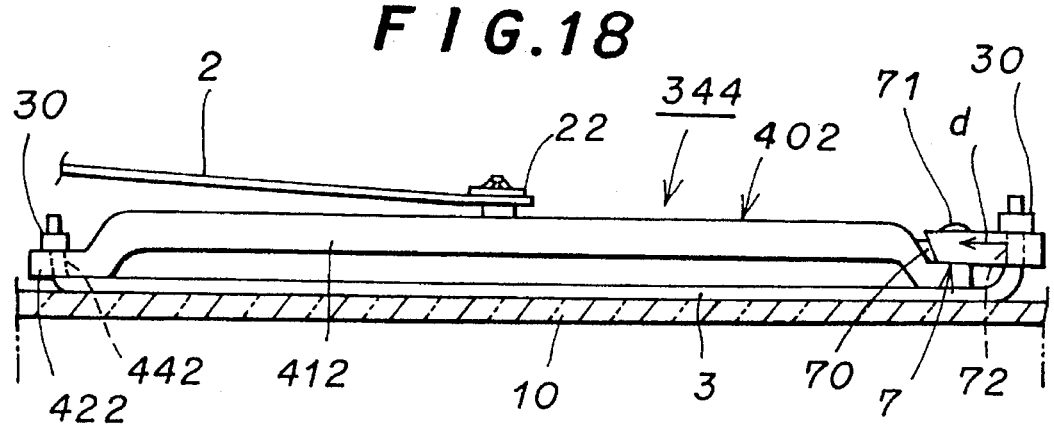

WIPER BLADE FOR AUTOMOTIVE OUTSIDE MIRROR WIPER AND AUTOMOTIVE OUTSIDE MIRROR WIPER USING SAME

BACKGROUND OF THE INVENTION a) Field of the Invention

The present invention relates to a wiper blade for an automotive outside mirror wiper, which is reciprocally moved over the reflecting surface of the outside mirror to wipe away raindrops or the like on the mirror surface.

Also the present invention relates to an automotive mirror wiper using the above-mentioned wiper blade.

b) Prior Art Statement

Generally, an automotive outside mirror comprises a mirror unit consisting of a mirror body and mirror holder and a mirror housing in which the mirror unit is installed. The mirror housing is fixed to outside a car body by means of a separate mirror base or a stay or the like formed integrally with the mirror housing. The automotive outside mirror reflects a scene behind the car on the reflecting surface of the mirror body (will be referred to simply as "mirror surface" hereinafter) and gives the rearview to the car driver.

Some of the recent automotive outside mirrors are equipped with a wiper to wipe away raindrops, other waterdrops or dust (will be referred to simply as "raindrops" hereinafter) staying on the mirror surface and which will prevent the mirror from positively giving the rearview to the card driver.

The wiper of this type generally consists of a wiper drive unit provided in the mirror housing, wiper arm installed to the drive unit and a wiper blade fitted to the wiper arm. When the drive unit is operated, the wiper blade is reciprocally moved over the mirror surface by means of the wiper arm to wipe away the raindrops from there.

A typical one of such wiper blades for automotive outside mirror wipers is known from the disclosure in the U.S. Pat. No. 4,369,542. This wiper blade will be described below with reference to FIG. 1.

FIG. 1 is a bottom view of a conventional wiper blade, in which the mirror surface is regarded as the front side.

In FIG. 1, the wiper blade is generically indicated with the reference numeral 900. The wiper blade 900 comprises a rubber ribbon 901 which wipes away raindrops on the mirror surface, a pair of backing channels 902 and 903 which retain the rubber ribbon 901, and a pair of stays 906 and 907 pivotably holding the pair of backing channels 902 and 903, respectively, by means of shafts 904 and 905, respectively and which are so coupled to each other by means of a shaft 908 as to be pivotable in relation to each other.

As shown, the wiper 900 has an arm 909 of which the one end is connected to a drive unit (not shown) provided inside a mirror housing of an automotive outside mirror (not shown). One (907) of the stays in pair is pivotably connected to the other end of the wiper arm 909 by means of a shaft 910.

When the drive unit for the wiper is operated, the wiper blade 900 is reciprocally moved over the mirror surface by means of the wiper arm 909 to wipe away raindrops from there by the rubber ribbon 901 thereof.

In the conventional wiper blade 900 shown in FIG. 1, the rubber ribbon 901 is itself high (dimension in the vertical direction of FIG. 1). It is fitted in the stays 906 and 907 in pair, which define together a mountain-like shape, by means of the pair of backing channels 902 and 903, respectively. So the total height H of the wiper blade 900 is large. Also the rubber ribbon 901 of this wiper blade 900 is itself thick at the top portion thereof (dimension from this side to the back of the paper sheet carrying FIG. 1) and it is retained as caught from both sides by the stays 906 and 907 in pair on the backing channels 902 and 903, respectively. So the total thickness of the wiper blade 900 is large. Namely, the conventional wiper blade 900 shown in FIG. 1 is large as a whole.

SUMMARY OF THE INVENTION

The present invention has an object to provide a totally small wiper blade for use in a wiper provided on an automotive outside mirror.

The present invention has another object to provide an automotive outside mirror wiper using the above-mentioned wiper blade according to the present invention and which can positively wipe away raindrops from the reflecting surface of the mirror.

The wiper blade according to the present invention consists of a plate-like blade lever which is to be fitted to a wiper arm and a wiping string provided on the opposite side of the blade lever to the mirror surface as extended tight between opposite ends of the blade lever and which is to wipe away raindrops on the mirror surface.

Thus, the height of the wiper blade according to the present invention is a maximum of a sum of the plate-like blade lever thickness, outside diameter of the wiping string and the spacing between the plate-like blade lever and wiping string. According to the present invention, the width of the wiper blade is that of the blade lever. The wiper blade according to the present invention is totally small as compared with the conventional wiper blade shown in FIG. 1.

The wiper according to the present invention uses the above-mentioned wiper blade according to the present invention. It further comprises a wiper blade guide formed on a holder of the mirror and which consists of an ascending slope along which the wiper blade having been moved to near its reverse position is moved and thus lifted off the mirror surface, and a vertical wall along which the wiper blade having been lifted off the mirror surface and then reversed is moved down or lowered from its lifted position above the mirror surface to a predetermined position on the mirror surface from which the wiper blade is to start moving back to its home position.

Because of the wiper blade guide, the wiper blade is raised off the mirror surface once at a position near the reverse position, reversed and then lowered to the mirror surface again from the lifted position.

Therefore, the wiper according to the present invention can positively wipe away raindrops on the mirror surface since the wiper blade jumps over the rainwater it has gathered by its forward movement and wipes it again along with new raindrops by its reverse movement with no trailing, during the reverse movement, of the rainwater having been gathered downward once by the forward movement and which will spoil the sight of the mirror surface once cleaned.

BRIEF DESCRIPTION OF THE DRAWINGS

FIG. 16 is an exploded perspective view of the fifth embodiment of the wiper blade, showing the essential part thereof;

FIG. 17 is a perspective view of the fifth embodiment of the wiper blade, showing the essential part thereof;

FIG. 18 is a partially sectional view of a sixth embodiment of the wiper blade according to the present invention when in use;

DETAILED DESCRIPTION OF THE PREFERRED EMBODIMENTS

The present invention will be better understood from the ensuing description, given herebelow, of selected eight ones of the preferred embodiments of the wiper blade according to the present invention and one of the embodiments of the mirror according to the present invention with reference to FIGS. 2 through 29.

FIGS. 2 through 8 show together the first embodiment of the wiper blade according to the present invention.

Figure 2:
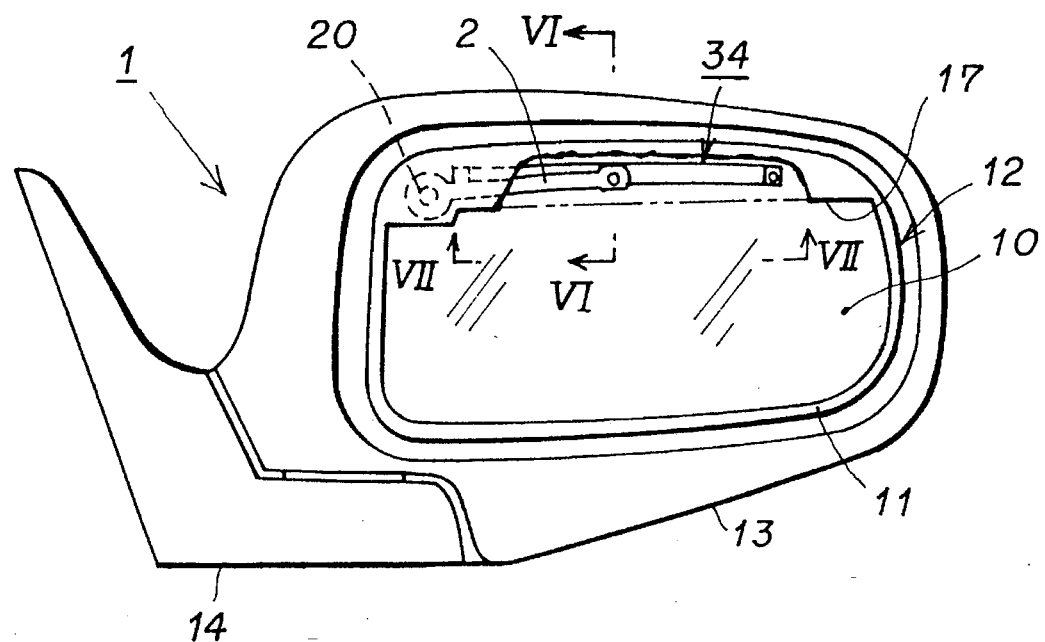
FIG. 2 is a partially fragmentary front view of an automotive outside mirror provided with the wiper using the wiper blade according to the present invention.

Referring now to FIG. 2, an automotive outside mirror is generically indicated with the reference numeral 1. The automotive outside mirror 1 is a so-called door-installed mirror which is to be fixed on the door of a car, and comprises a mirror unit 12 consisting of a mirror body 10 and a mirror holder 11, a mirror housing 13 in which the mirror unit 12 is installed horizontally pivotably by means of a pivoting mechanism (not shown), and a mirror base 14 tiltably installed outsides on the car body, more particularly on the car door (not shown), for example.

Figure 7:
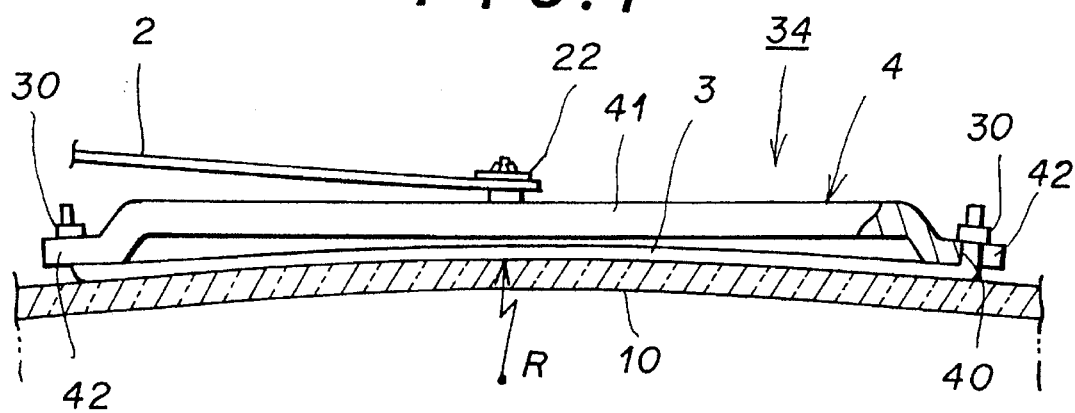
FIG. 7 is a sectional view taken along the line VII—VII in FIG. 2 for a convex mirror surface.
Figure 8:
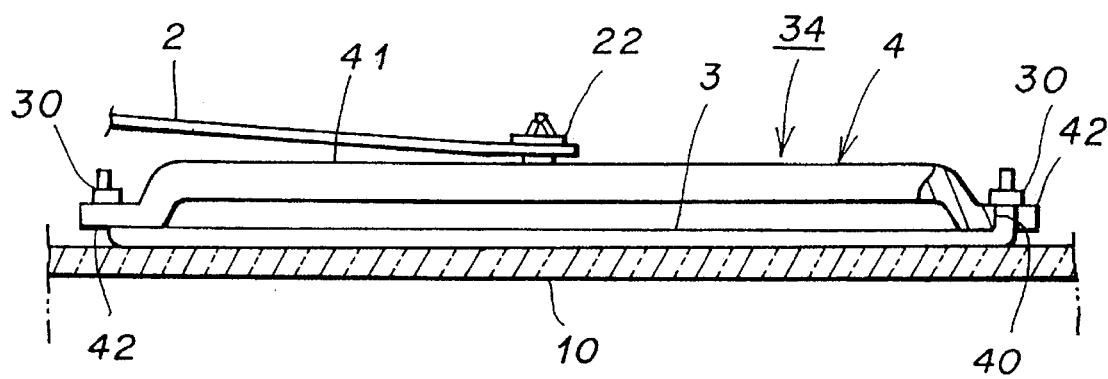
FIG. 8 is a similar sectional view to FIG. 7 for a flat mirror surface.

The mirror body 10 consisting of a transparent plate such as a sheet glass, synthetic resin sheet or the like and a reflecting layer attached on the back of the transparent plate. The front surface of the mirror body 10 or the mirror surface is convex having a radius of curvature R as shown in FIG. 7 or flat as shown in FIG. 8 as the case may be. The mirror body 10 reflects a scene behind the car and gives the car driver the rearview.

Figure 6:
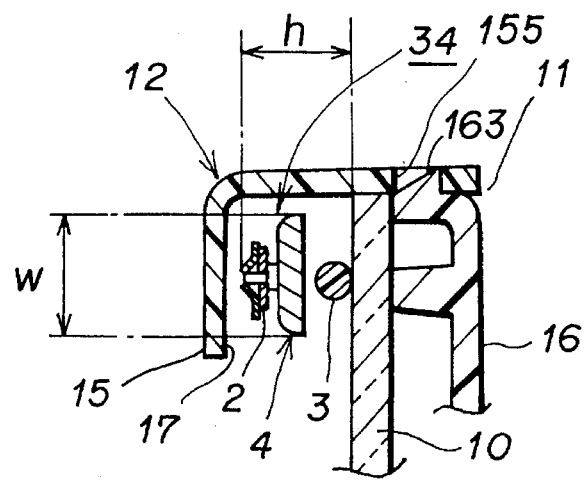
FIG. 6 is a sectional view taken along the line VI—VI in FIG. 2.

The mirror holder 11 is made of a synthetic resin, for example, and covers the whole circumference and the back of the mirror body 10 as shown in FIG. 6, thereby protecting and holding the mirror body 10. The mirror holder 11 consists of a rim 15 formed at the front side of the mirror body 10 and a back plate 16 provided at the rear side. The rim 15 and back plate 16 are joined to each other by fitting an engagement pawl 163 of the back plate 16 into an engagement hole 155 of the rim 15. This engagement may be done otherwise. As shown in FIG. 6, the rim 15 of the mirror holder 11 has an overhanging downward-extended portion 17 formed like a penthouse along the upper circumference thereof. The rear side of the overhanging portion 17 defines with the front surface of the mirror body 10 a space in which the wiper blade 34 according to the present invention is to be housed while it is out of use as will be further discussed later.

The mirror housing 13 is made of a synthetic resin, for example. It has a hollow shape open at the front side thereof. The mirror unit 12 is housed inside the mirror housing 13 and the mirror surface of the mirror body 10 is disposed at the front opening of the mirror housing 13.

The mirror base 14 is fixed at the lateral side thereof to the car door. The mirror housing 13 having the mirror unit 12 housed therein is installed to the mirror base 14 in such a manner that it can be turned from a viewing (normal) position where it protrudes laterally from the car body to a front (folded) position where the mirror housing outer end is directed toward the head of the car or a rear (folded) position where the mirror housing outer end is directed toward the tail of the car, including a parking (folded) position where the mirror housing 13 is folded to a position nearly parallel to the car body or the mirror surface faces directly the car body lateral side, or vice versa.

The automotive outside mirror 1 constructed as mentioned above is provided with a wiper which will be described later.

The automotive outside mirror 1 is provided with a mechanism which is remote-controlled to turn the mirror unit 12 consisting of the mirror body 10 and mirror holder 11 vertically and horizontally. The mirror 1 is also provided with a mechanism which is remote-controlled to turn the mirror housing 13 from the viewing position where it protrudes laterally from the car body to the front, rear or parking position, or vice versa in relation to the mirror base 14.

The above-mentioned automotive outside mirrors also include an automotive outside mirror of which the mirror stay integral with the mirror housing 13 is fixed to the fender of the car, so-called fender-installed mirrors, in addition to the above-mentioned door-installed mirror.

The wiper provided on the above-mentioned automotive outside mirror 1 comprises a drive unit (not shown) provided inside the mirror housing 13, wiper arm 2 connected to the drive unit by means of a wiper shaft 20 and a wiper blade 34 fixed to the wiper arm 2 as shown in FIG. 2.

The drive unit comprises a drive motor, reduction gear, etc., for example. It is located at the rear side of the mirror unit 12 inside the mirror housing 14. The drive unit may be used independently to drive the wiper blade, it may be used to turn the mirror unit 12 vertically and/or horizontally in relation to the mirror housing 13 (for a remote-controlled door-installed mirror) or it may be used to turn the mirror housing 13 in which the mirror unit 12 is installed from the viewing position to the front, rear or parking position, or vice versa (for a motor-driven folding type door-installed mirror). In any case, the drive unit is used in conjunction with a power transmission, power shift and so forth for such purposes of driving.

The drive unit is provided with the wiper shaft 20 which is located at a left upper portion of the mirror unit 12 as shown in FIG. 2 and protrudes from the back to the front of the mirror unit 12. The wiper shaft 20 is covered with the aforementioned penthouse-like overhanging portion 17 of the rim 15, so it will not esthetically spoil the mirror.

Figure 3:
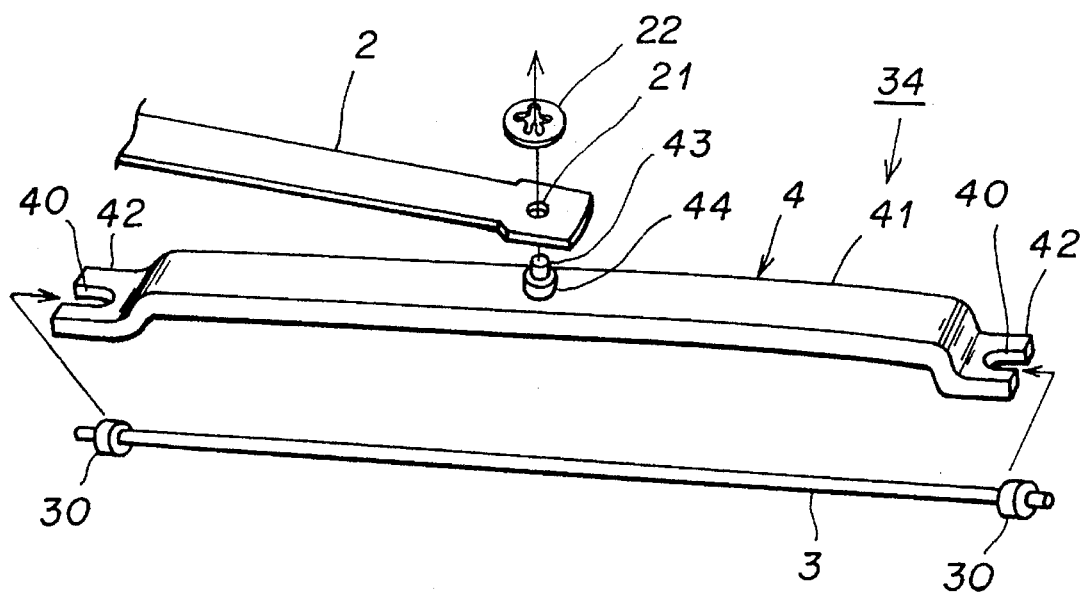
FIG. 3 is an exploded perspective view of a first embodiment of the wiper blade and wiper arm according to the present invention.
Figure 4:
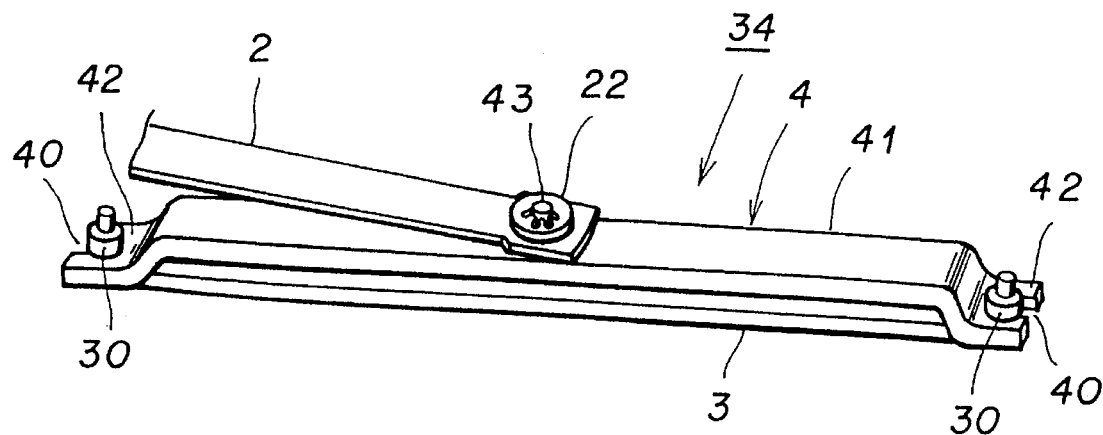
FIG. 4 is a perspective view of the wiper arm and wiper arm assembled together.
Figure 5:
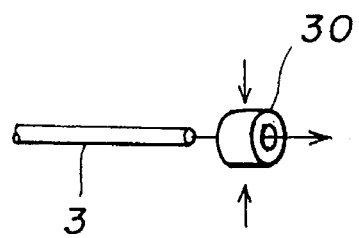
FIG. 5 is an exploded perspective view of the wiping string and retainer.

The wiper arm 2 is a generally rectangular plate as shown in FIGS. 3 and 4, made of, for example, a metal or a synthetic resin. The wiper arm 2 is fixed at one end thereof to the wiper shaft 20 by means of a wiper head (not shown) while it has fitted to the other end thereof the wiper blade 34 according to the present invention as will be described later.

When the drive unit is put into action, the wiper blade 34 which will be described in further detail is moved reciprocally by means of the wiper shaft 20 and wiper arm 2 to wipe away raindrops on the front surface (reflecting side) of the mirror body 10 (the front surface of the mirror body 10 will be referred to simply as "mirror surface 10" hereafter).

The wiper blade 34 according to the present invention comprises a wiping string 3 which wipes away raindrops on the mirror surface 10, and a plate-like blade lever 4 which holds the wiping string 3 as extended tight between the opposite ends thereof.

The wiping string 3 is a synthetic resin-made string (single string) of, for example 0.7 to 1.0 in diameter or the like. It should be noted that the wiping string 3 may be any string-like thing which could positively wipe the mirror surface 10 without being elongated when tightened with an appropriate tension, in addition to the above-mentioned single string. For example, it may be a twist, braid or the like made of any material whether artificial or natural.

The wiping string 3 has fixed a retainer 30 at each end thereof. The retainer 30 is made of a small metallic cylinder or the like. To fix the retainer 30 on the wiping string 3, the end portion of the wiping string 3 is inserted through the metallic cylinder 30 and the latter is crushed onto the wiping string 3.

The plate-like blade lever 4 is an elongated, generally rectangular plate, as shown in FIGS. 3 and 4, made of a metal, synthetic resin or the like having a rigidity with which the blade lever 4 can withstand a deflection, torsion and the like given thereto when in use. The blade lever 4 has a rigid body 41 terminated by a string fixture 42 on either end thereof. A string receiving recess 40 is formed in each string fixture 42. Each of the string receiving recesses 42 extends longitudinally of the blade lever 4 from the end face of the string fixture 42 toward the blade lever 4. The inner end of the string receiving recess 40 has a semi-circular shape.

Each end of the wiping string 3, which is passed through its respective retainer 30, extends from a front side of the blade lever 4 to the backside thereof. The retainers 30 are disposed adjacent the recesses 40 on the back side of the blade so as to prevent the string ends 3 from being pulled through the recesses 40, and thereby holding the string 3 extended tight on the front side of the blade lever 4.

The tensing of this wiping string 3 by the blade lever 4 is such that the central portion of the wiping string 3 having a total length of 140 to 150 mm is elongated 2 to 3 mm when a weight of 40 to 50 g is hung from nearly the center of the wiping string 3.

The blade lever 4 is fitted to the wiper arm 2. More particularly, the wiper arm 2 has formed a small circular through-hole 21 in the other end thereof. The blade lever 4 has provided as protruded at the center thereof a stepped shaft consisting integrally of a smaller-diameter section 43 and larger-diameter section 44. The smaller-diameter shaft section 43 of the blade lever 4 is inserted into the through-hole 21 in the wiper arm 2 and a push-nut 22 is fitted onto the shaft section 43 to couple the blade lever 4 rotatably and vertically movably to the wiper arm 2. Thus, there remains between the shaft section 43 of the blade lever 4 and the wiper arm 2 a gap intended for no immobilization in relation between the blade lever 4 and wiper arm 2. The push-nut 22 is provided to prevent the blade lever 4 and wiper arm 2 from being disengaged from each other.

When the blade lever 4 is coupled to the wiper arm 2, the wiper blade 34 will be forced onto the mirror surface 10 as shown in FIGS. 7 and 8. At this time, both near-end portions of the wiping string 3 are forced directly to the mirror surface 10 by the string fixtures 42, respectively, of the blade holder 4 and the rest of the wiping string 3 is evenly forced to the mirror surface 10.

The wiper blade 34 constructed according to the present invention as having been described in the foregoing functions as will be described below:

First, the drive unit for the wiper is put into operation. The wiper blade 34 is reciprocally moved over the mirror surface 10 of the automotive outside mirror 1 by means of the wiper arm 2 driven the drive unit. The wiping string 3 held as extended tight by the blade lever 4 of the wiper blade 34 will wipe away raindrops on the mirror surface 10.

Figure 1:
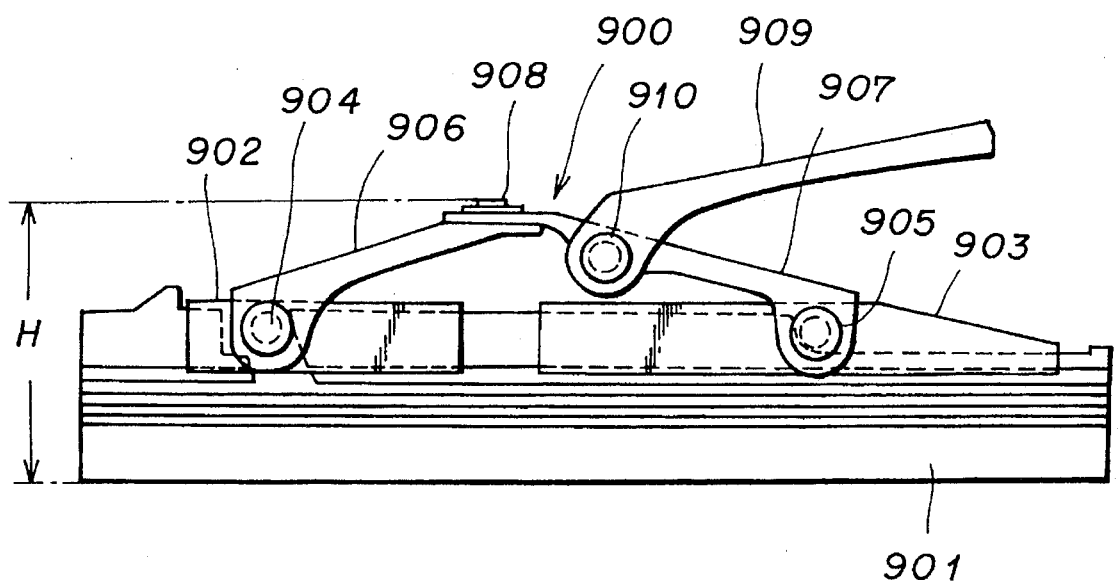
FIG. 1 is a bottom view of a conventional wiper blade.

In the wiper blade 34 according to this first embodiment of the present invention, the wiping string 3 is held as extended tight on one side of the blade lever 4. The height h of the wiper blade 34 is a sum of the thickness of the blade lever 4, outside diameter of the wiping string 3 and the space from the blade lever 4 to the wiping string 3, and the width w of the wiper blade 34 is that of the blade lever 34. Thus, the wiper blade 34 according to the present invention can be totally small as compared with the conventional wiper blade shown in FIG. 1. Owing to this small dimensions of the wiper blade 34 according to the present invention, the penthouse-like downward-extended overhanging portion 17 of the rim 15, housing the wiper blade 34, wiper arm 2, etc., can be designed small. The overhanging portion 17 itself can also be designed small, which will lead to a wide effective area of the mirror surface 10.

The wiper blade 34 according to the present invention, using the wiping string 3, shows the following actions and effects.

(1) Since the area of contact with the mirror surface is small, only a small power is required for driving the wiper. Thus, the drive unit as well as the entire wiper can be designed small, leading to a remarkable reduction of the manufacturing costs.

(2) The wiping string 3 made of an artificial material can be colored suitably to the color of the mirror surface 10 or the wiping string 3 made of the artificial material and blade lever 4 made of a synthetic resin can be made transparent. The wiping string 3 and blade lever 4 are not noticeable, which will contribute to the esthetic improvement of the wiper.

(3) The wiping string 3 is easy to follow the curvature of the mirror surface 10. More particularly, when set on the mirror surface 10, the wiping string 3 extends along the mirror surface 10 whether the mirror surface 10 has a radius of curvature R, for example, as shown in FIG. 7 or is flat as shown in FIG. 8. Since the wiping string 3 is evenly forced to the mirror surface 10, it can effectively wipe away raindrops from there.

Furthermore, the wiper blade 34 according to this embodiment of the present invention consists only of the blade lever 4 and the wiping string 3 extended tight on one side of the blade lever 4. Namely, the number of necessary parts is much smaller than that for the conventional wiper blade 900 shown in FIG. 1.

The wiper blade 34 according to the first embodiment of the present invention can easily be assembled just by engaging the retainers 30 of the wiping string 3 into the respective string receiving recesses 40 in the opposite end portions (string fixtures 42) of the blade lever 4. That is, each end of the wiping string 3, which is passed through its respective retainer 30, extends from a front side of the blade lever 4 to the back side thereof. The retainers 30 are disposed adjacent the recesses 40 on the back side of the blade so as to prevent the string ends 3 from being pulled through the recesses 40, and thereby holding the string 3 extended tight on the front side of the blade lever 4.

According to this embodiment, the wiper blade 34 and wiper arm 2 may be coupled to each other by a rivet or the like, not with the shaft 43 and push-nut 22.

Figure 9:
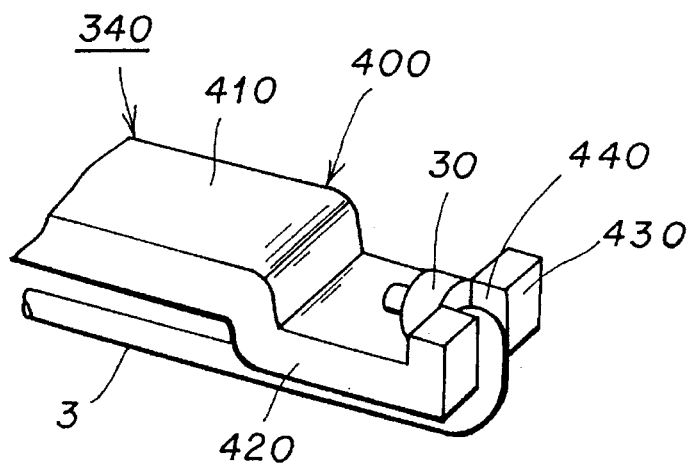
FIG. 9 is a partially perspective view of a second embodiment of the wiper blade according to the present invention, showing the essential part thereof.
Figure 10:
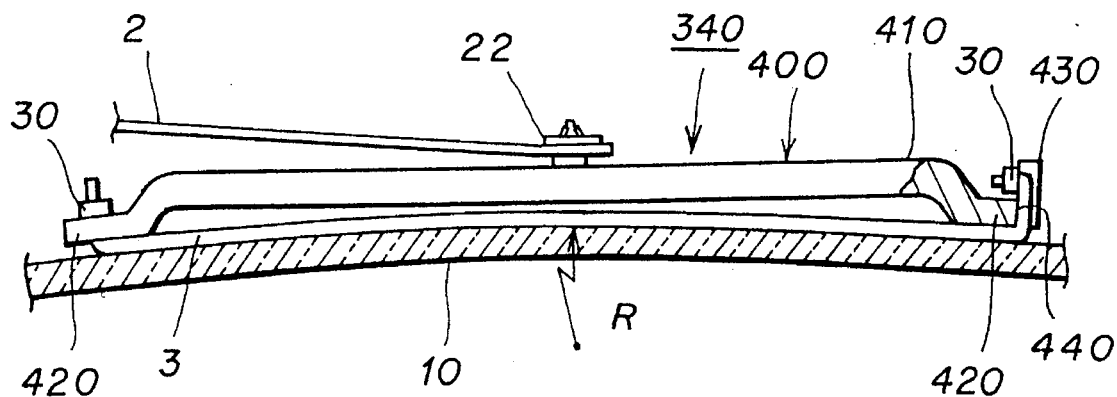
FIG. 10 is a partially sectional view of the second embodiment when in use.

FIGS. 9 and 10 show together the second embodiment of the wiper blade according to the present invention. In Figures, the same reference numerals as in FIGS. 1 through 8 indicate the same elements as shown in FIGS. 1 through 8.

In Figures, the reference numeral 340 indicates a wiper blade 340. The wiper blade 340 according to the second embodiment comprises a blade lever 400 having a rigid blade lever 400, a string fixture 420 formed integrally on either end of the blade lever 400, a vertical projection 430 formed integrally at the end face of one of the string fixtures 420 and a string receiving recesses 440 formed in each of the string fixture 420 and vertical projection 430. By engaging the retainers 30 of the wiping string 3 in the respective string receiving recesses 440 in the blade lever 4, the string 3 is held as extended tight on side of the blade lever 4. That is, each end of the wiping string 3, which is passed through its respective retainer 30, extends from a front side of the blade lever 400 to the back side thereof. The retainers 30 are disposed adjacent the recesses 440 on the back side of the blade so as to prevent the string ends 3 from being pulled through the recesses 440, and thereby holding the string 3 extended tight on the front side of the blade lever 400.

The wiper blade 340 according to the second embodiment shows the same actions and effects as the previously-mentioned wiper blade 34 according to the first embodiment.

Figure 11:
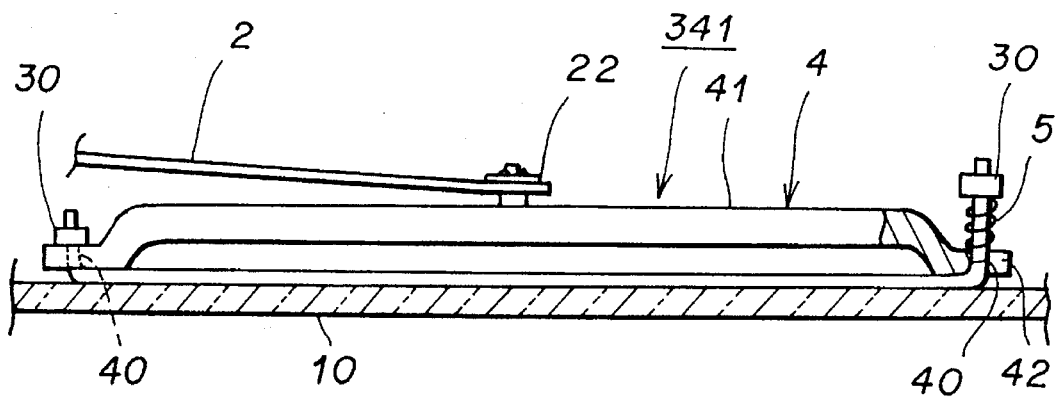
FIG. 11 is a partially sectional view of a third embodiment of the wiper blade according to the present invention when in use.
Figure 12:
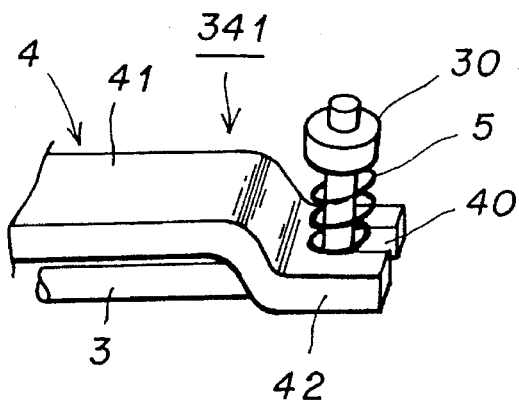
FIG. 12 is a perspective view of the third embodiment of the wiper blade, showing the essential part thereof.

FIGS. 11 and 12 show together the third embodiment of the wiper blade according to the present invention. In Figures, the same reference numerals as in FIGS. 1 through 10 indicate the same elements as shown in FIGS. 1 through 10.

In Figures, the reference numeral 341 indicates a wiper blade. The wiper blade 341 has a compression coil spring 5 fitted on the wiping string 3 and placed between the edge of one of the string receiving recesses 40 formed in the blade lever 4 and one of the retainers 30 of the wiper blade 3. The compression coil spring 5 is provided to pull the wiping string 3 with the resilience thereof.

Figure 13:
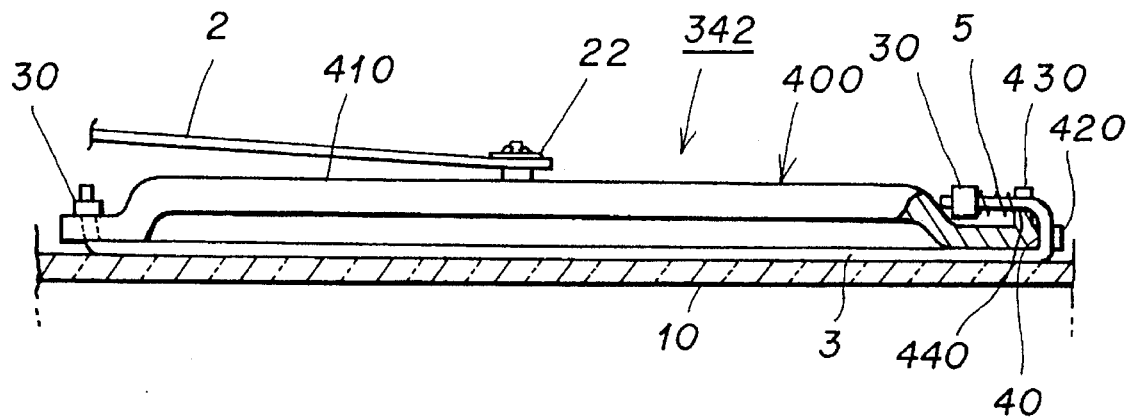
FIG. 13 is a partially sectional view of a fourth embodiment of the wiper blade according to the present invention when in use.
Figure 14:
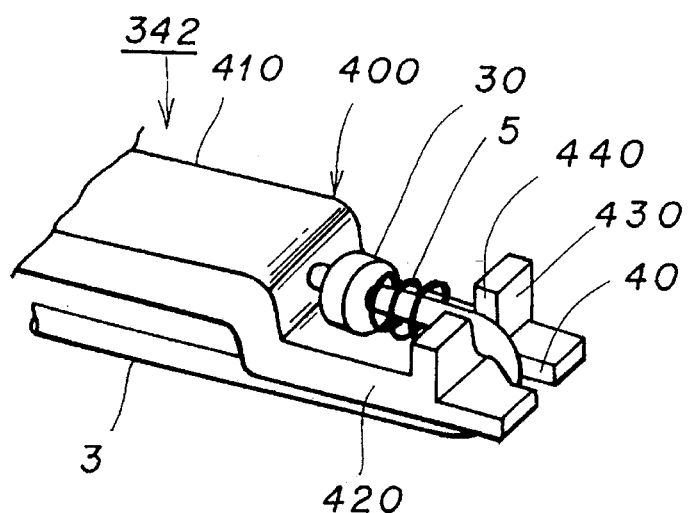
FIG. 14 is a perspective view of the fourth embodiment of the wiper blade, showing the essential part thereof.

FIGS. 13 and 14 show together the fourth embodiment of the wiper blade according to the present invention. In Figures, the same reference numerals as in FIGS. 1 through 12 indicate the same elements as shown in FIGS. 1 through 12.

In Figures, the reference numeral 342 indicates a wiper blade. The wiper blade 342 has a compression coil spring 5 fitted on the wiping string 3 and placed between the edge of string receiving recesses 440 formed in a vertical projection 430 of the blade lever 400 and one of the retainers 30 of the wiper blade 3. The vertical projection 430 is formed integrally nearly at the center of a string fixture 420 and a string receiving recess 40 is formed in the string fixture 420 in a position outer than the vertical projection 430.

In the wiper blade 341 according to this embodiment, one end of the wiping string 3, retainer 30 on the string 3 and the coil spring 5 are so set that their axial directions are generally parallel to the length of the blade lever 400, namely, to the mirror surface 10. Therefore, the height of the wiper blade 342 can be reduced.

Figure 15:
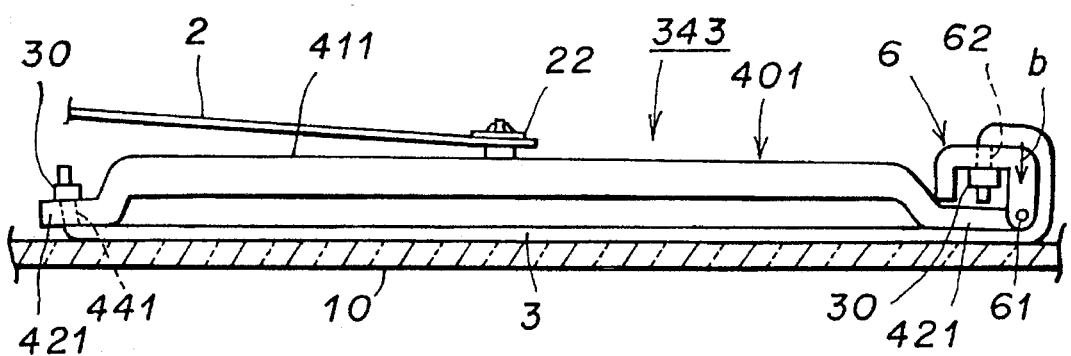
FIG. 15 is a partially sectional view of a fifth embodiment of the wiper blade according to the present invention when in use.

FIGS. 15 through 17 show together the fifth embodiment of the wiper blade according to the present invention. In Figures, the same reference numerals as in FIGS. 1 through 14 indicate the same elements as shown in FIGS. 1 through 14.

In Figures, the reference numeral 343 indicates a wiper blade. The wiper blade 343 has a blade lever 401 comprising a rigid body 411 and a string fixture 421 formed integrally at either outer end of the body 411. A C-shaped member 6 is rotatably provided at one of the string fixtures 421 of the blade lever 401. More particularly, a projection 431 is formed integrally at the end of the string fixture 421 of the blade lever 401 and a fork 60 is formed at one end of the rotatable member 6. The rotatable member 6 is connected at the fork thereof to the projection 431 of the blade lever 401 rotatably about a shaft (rivet or the like) 61. String receiving recesses 62 and 441 are formed in the other end of the rotatable member 6 and other string fixture 421, respectively.

The retainer 30 on one end of the wiping string 3 is engaged on the edge of the string receiving recess 40 in one end of the blade lever 401 while the retainer 30 on the other end of the wiping string 3 is engaged on the edge of the string receiving recess 62 in the rotatable member 6 positioned as shown in FIG. 16. That is, each end of the wiping string 3 passes through its respective retainer 30. One end of the wiping string 3 extends from a front side of the blade lever 401 to the back side thereof, while the other end of the wiping string 3 extends through the string receiving recess 62 in the rotatable member 6. The retainers 30 are disposed adjacent the recesses 40, 62 so as to prevent the string ends 3 from being pulled through the recesses 40,62. When the rotatable member 6 is turned in the direction of arrow a (counterclockwise) in FIG. 17 and locked to the blade lever 401, the wiping string 3 is pulled about 180° by the rotatable member 6 and one of the string fixture 421. Thus, the wiping string 3 is held as extended tight on one side of the blade lever 401. Since the wiping string 3 forces the rotatable member 6 in the direction of arrow b to the blade lever 401 at this time, the rotatable member 6 is securely locked to the blade lever 401. The C-shape of the rotatable member 6 and the wiping string 3 forcing the rotatable member 6 in the direction of arrow b as shown in FIG. 15 will prevent the rotatable member 6 itself from being rotated back.

Figure 19:
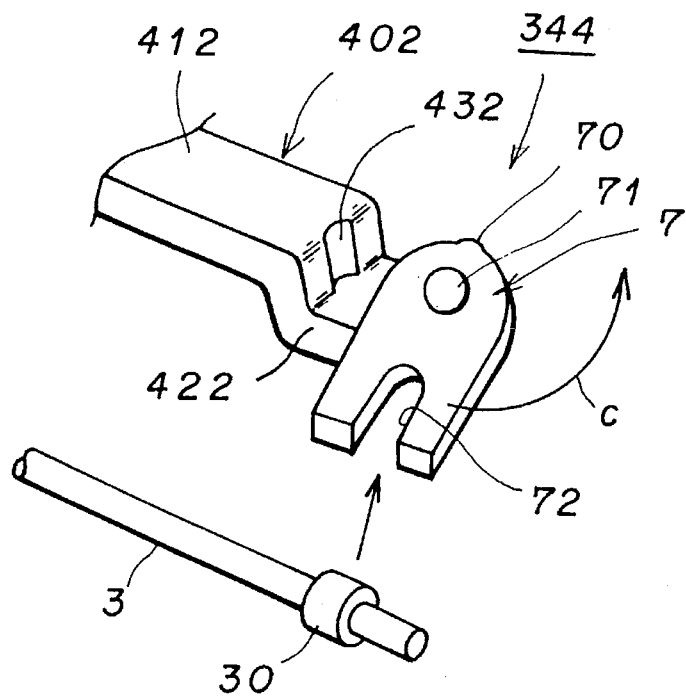
FIG. 19 is a perspective view of the sixth embodiment of the wiper blade, showing the essential part thereof.

FIGS. 18 and 19 show together the sixth embodiment of the wiper blade according to the present invention. In Figures, the same reference numerals as in FIGS. 1 through 17 indicate the same elements as shown in FIGS. 1 through 17.

In Figures, the reference numeral 344 indicates a wiper blade. The wiper blade 344 has a blade lever 402 comprising a rigid body 412 and a string fixture 422 formed integrally at either outer end of the body 412. The blade lever 402 has a rotatable member 7 provided at one of the string fixtures 422. The member 7 is installed to the string fixture 422 rotatably about a pivot (rivet or the like) 71 located in a position off the center of the rotatable member 7 itself. The blade lever 402 has formed in the end wall of the body 412 thereof a concavity 432 which plays one part of a means of locking the rotatable member 7, while the rotatable member 7 has formed integrally at the end thereof near the pivot 71 a projection 70 which plays the other part of the locking means. A string receiving recess is formed in the end portion of the rotatable member 7 farther from the pivot 71 while another string receiving recess 422 is formed in the other string fixture 422 of the blade lever 402.

The retainer 30 on one end of the wiping string 3 is engaged on the edge of the string receiving recess 442 at one end of the blade lever 402, while the retainer 30 on the other end of the wiping string 3 is engaged on the edge of the string receiving recess 72 in the rotatable member 7 positioned as shown in FIG. 19. That is each end of the wiping string 3 passes through its respective retainer 30. One end of the wiping string 3 extends from a front side of the blade lever 402 to the back side thereof, while the other end of the wiping string 3 extends through the string receiving recess 72 in the rotatable member 7. The retainers 30 are disposed adjacent the recesses 442,72 so as to prevent the string ends 3 from being pulled through the recesses 442,72. The rotatable member 7 is turned in the direction of arrow c (counterclockwise) in FIG. 19 until the rotatable member 7 is locked to the blade lever 402 with the projection 70 of the rotatable member 7 engaged in the concavity 432 in the end wall of the blade lever 402. Then, the wiping string 3 is pulled by the rotatable member 7 and held as extended tight on one side of the blade lever 402. At this time, the wiping string 3 forces the rotatable member 7 in the direction of arrow d to the blade lever 402, so that the rotatable member 7 is securely locked to the blade lever 402.

Figure 20:
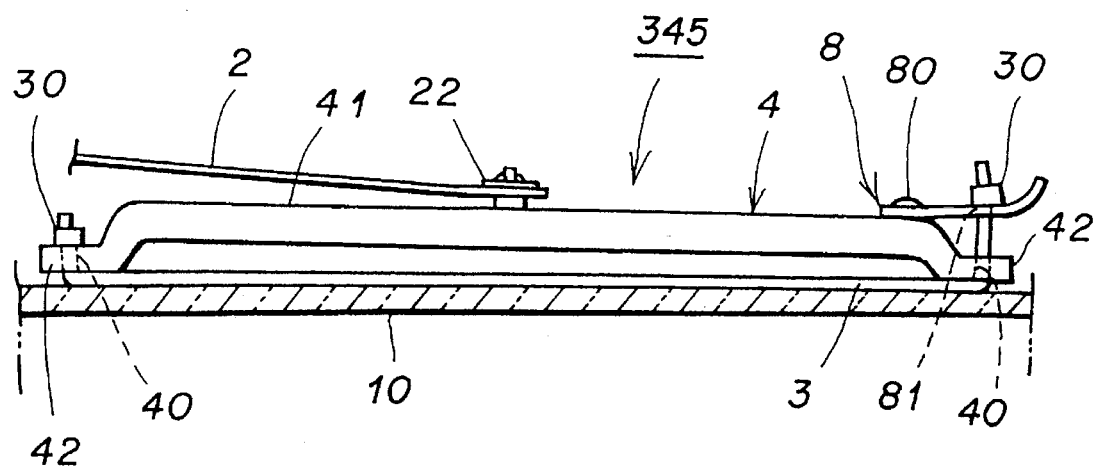
FIG. 20 is a partially sectional view of a sixth embodiment of the wiper blade according to the present invention when in use.
Figure 21:
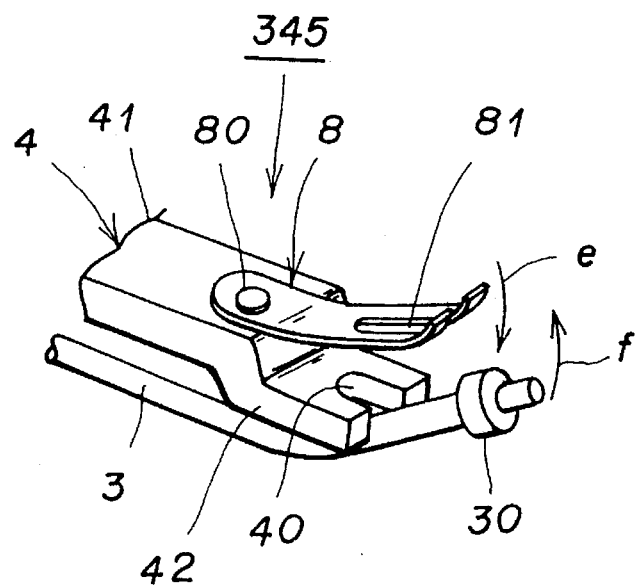
FIG. 21 is a perspective view of the sixth embodiment of the wiper blade, showing the essential part thereof.

FIGS. 20 and 21 show together the seventh embodiment of the wiper blade according to the present invention. In Figures, the same reference numerals as in FIGS. 1 through 19 indicate the same elements as shown in FIGS. 1 through 19.

In Figures, the reference numeral 345 indicates a wiper blade. The wiper blade 345 has a leaf spring 8 which is fixed at one end thereof by a rivet 80 to one end of the body 41 of the blade lever 4. The leaf spring 8 has an string receiving recess 81 formed in the other end thereof.

The retainer 30 on one end of the wiping string 3 is engaged on the edge of the string receiving recesses 40 in the blade lever 4. On the other hand, the leaf spring 8 is deflected in the direction of arrow e and the retainer 30 on the other end of the wiping string 3 is pulled in the direction of arrow f and engaged on the edge of the string receiving recess 81 in the leaf spring 8, as shown in FIG. 21. Thus, the wiping string 3 is pulled and held as extended tight under the action of the leaf spring 8.

Figure 22:
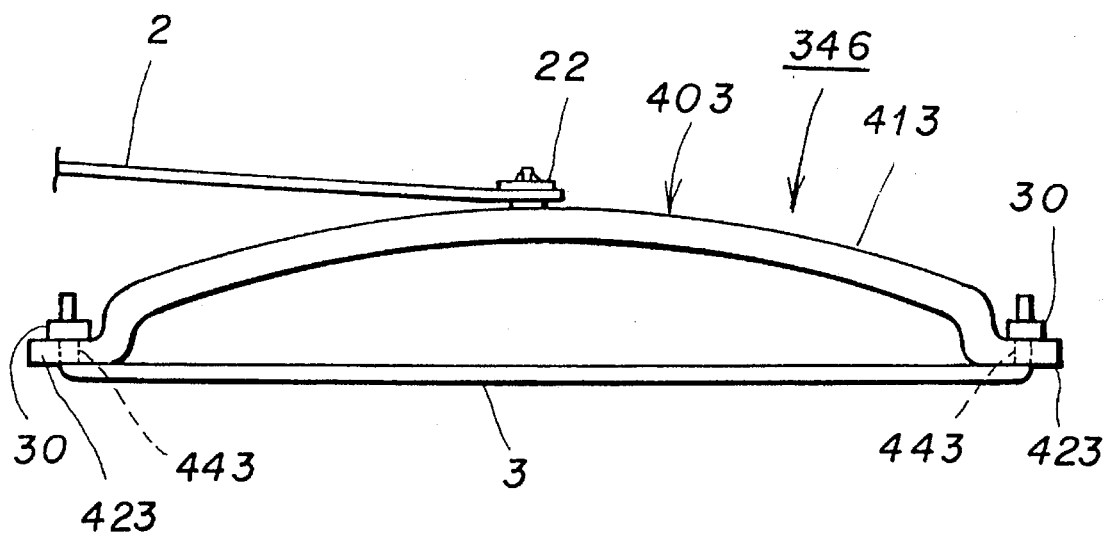
FIG. 22 is a bottom view of an eighth embodiment of the wiper blade according to the present invention.

FIGS. 22 shows the eighth embodiment of the wiper blade according to the present invention. In Figures, the same reference numerals as in FIGS. 1 through 21 indicate the same elements as shown in FIGS. 1 through 21.

In Figure, the reference numeral 346 indicates a wiper blade. The wiper blade 346 has a blade lever 403 comprising a resilient bow-like body 413, a string fixture 423 formed integrally at either outer end of the body 413, and a string receiving recess 443 formed in each of the string fixtures 423.

With the retainers 30 of the wiping string 3 engaged on the edges, respectively, of both the string receiving recesses 443, the wiping string 3 is held as extended tight on one side of the blade lever 403.

FIGS. 23 through 29 show together one embodiment of the automotive outside mirror wiper according to the present invention. In Figures, the same reference numerals as in FIGS. 2 through 22 indicate the same elements as shown in FIGS. 2 through 22.

The structure of the mirror unit 12 of the automotive outside mirror will be described in further detail below with reference to FIGS. 23 through 26.

Figure 24:
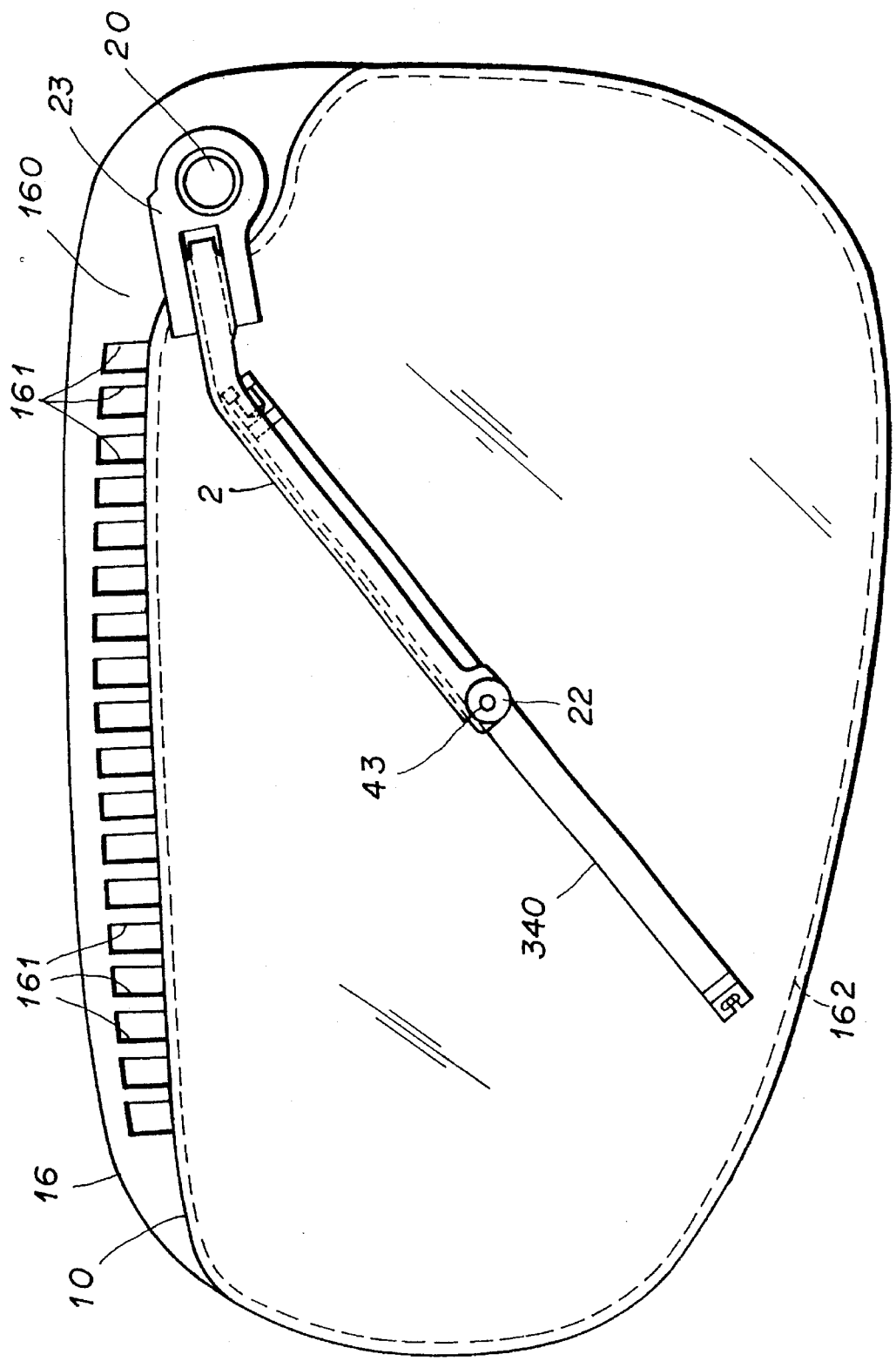
FIG. 24 is a front view of the mirror unit shown in FIG. 23 with the rim of the mirror holder removed.
Figure 25:
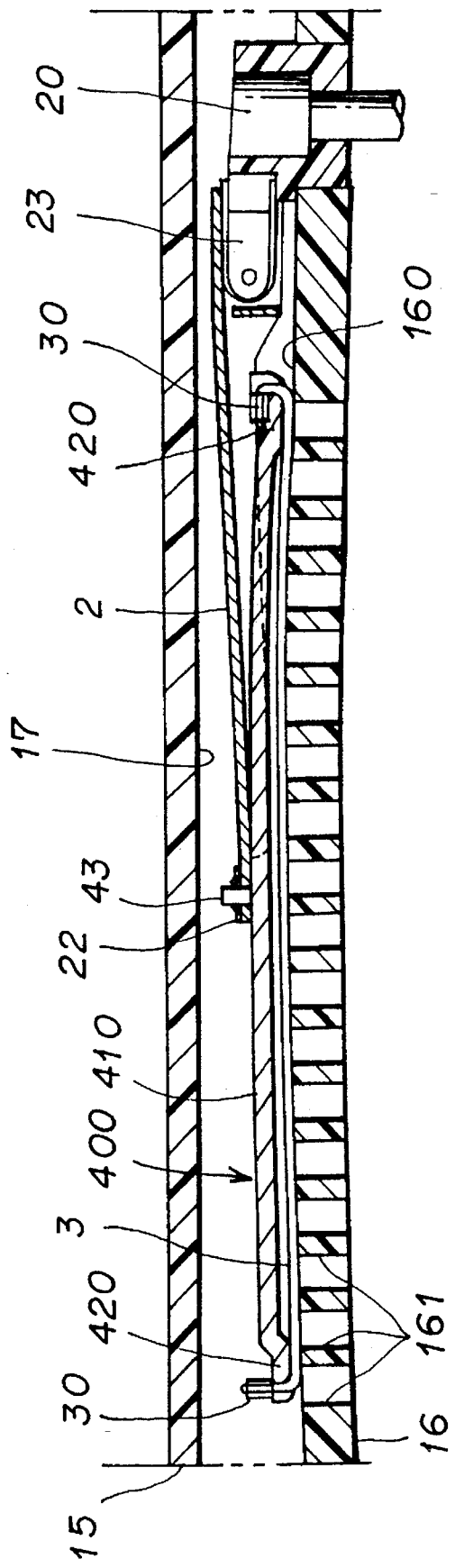
FIG. 25 is a sectional view taken along the line XXV—XXV in FIG. 23.
Figure 26:
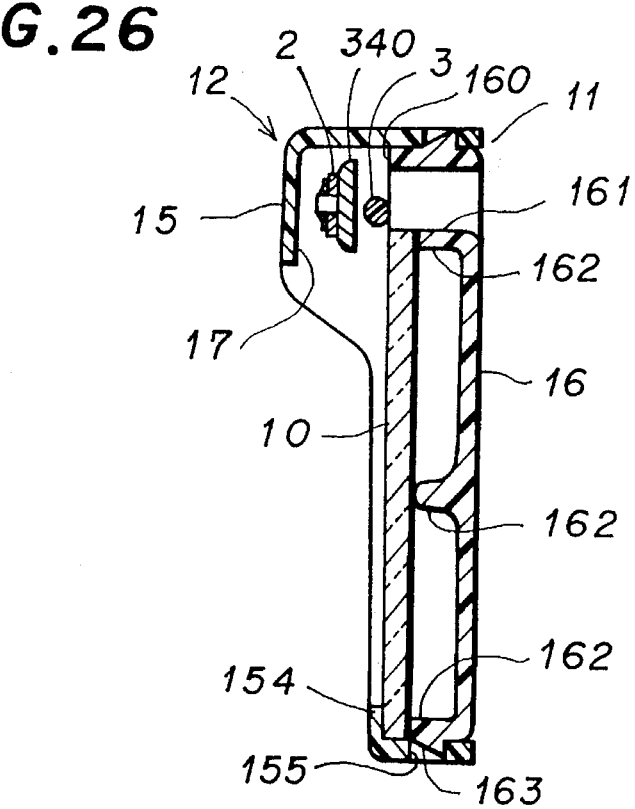
FIG. 26 is a sectional view taken along the line XXVI—XXVI in FIG. 23.

The mirror body 10 and back plate 16 composing the mirror unit 12 are so shaped at the front thereof that when they are superposed one on the other, an upper portion 160 of the back plate 16 will project from the upper edge of the mirror body 10 as shown in FIG. 24. As shown, a plurality of drain holes 161 is formed in the upper portion of the back plate 16. The front surface of the upper portion 160 of the back plate 16 is generally flush with the surface of the mirror body 10. The back plate 16 is open at the front side thereof in the area other than the upper portion 160. The mirror body 10 is held at the rear side thereof on the edge of the opening in the back plate and ribs 162. At the fight end portion of the upper portion 160 of the back plate 16, the wiper shaft 20 protrudes from the back to the front of the back plate 16.

Figure 23:
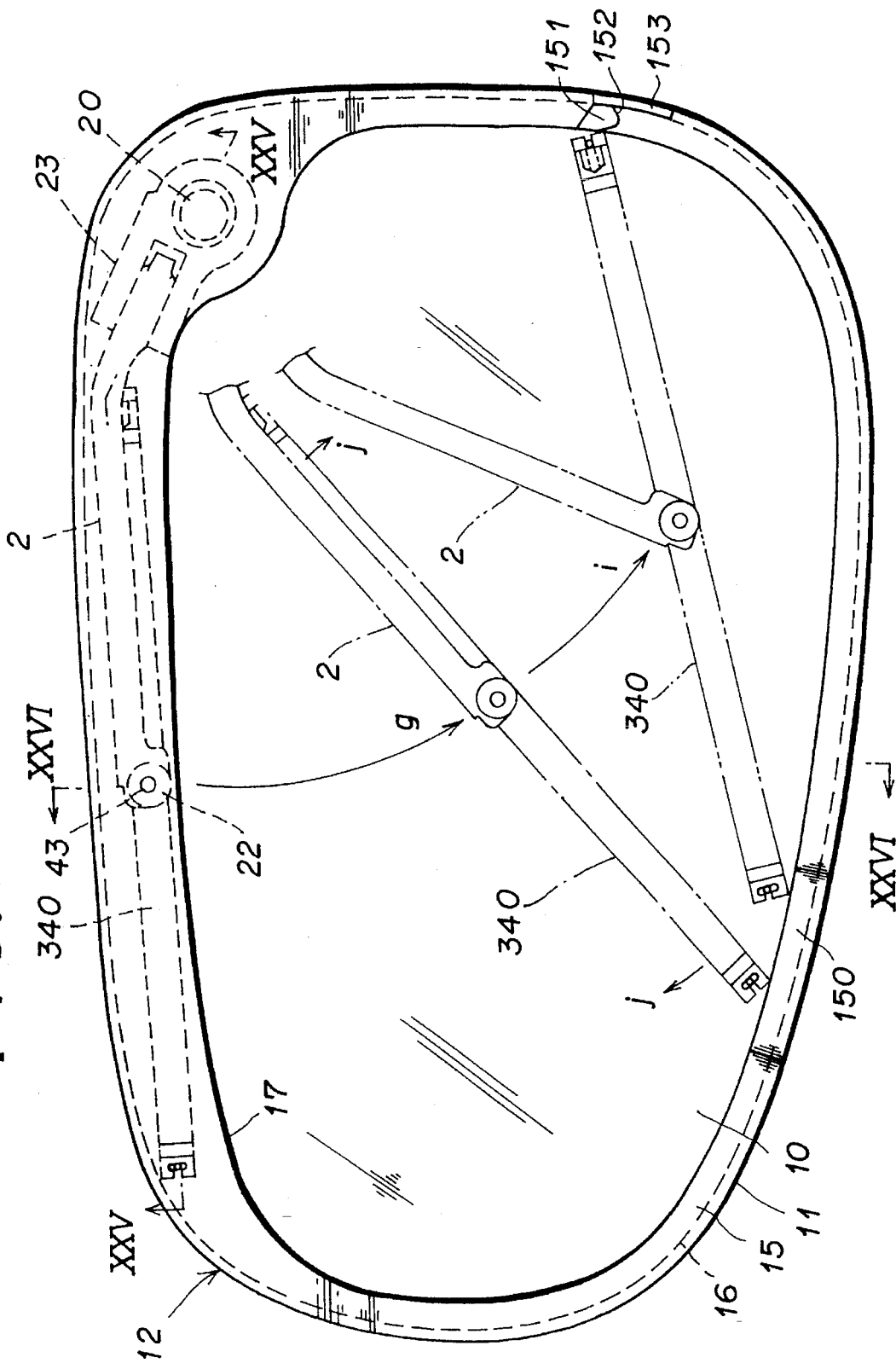
FIG. 23 is a front view of a mirror unit of an automotive outside mirror provided with a first embodiment of the wiper according to the present invention.

As shown in FIG. 23, the rim 15 integral with the back plate 16 has a front profile a size larger than that of the back plate 16. The penthouse-like overhanging portion 17 is formed at the upper portion of the rim 15 correspondingly to the upper portion 160 of the back plate 16. Thus, there is defined between the back of the overhanging portion 17 and the front of the upper portion 160 of the back plate 16 a space in which the wiper blade 340 is to be housed when it has come to its home position.

In FIG. 23, the reference numeral 23 indicates a wiper head installed to the wiper shaft 20 of the wiper. The wiper head 23 has fixed thereto the wiper arm 2 to which the wiper blade 340 is connected by means of the shaft 43, push-nut 22 and so forth.

When the wiper shaft 20 is rotated reciprocally (forward and reversely), the wiper blade 340 is moved reciprocally between a parking position indicated with a broken line in FIG. 23 and a reverse position indicated with a two-dot chain line also in FIG. 23 as driven by the drive unit by means of the wiper head 23 and wiper arm 2, thereby wiping away raindrops on the mirror surface 10.

The reciprocal motion of the wiper blade 340 will be described in further detail below with reference to FIG. 23.

When the wiper shaft 20 is rotated counterclockwise, the wiper blade 340 and wiper arm 2, kept generally in line with each other, are moved forward by means of the wiper head 23 in the direction of arrow g (counterclockwise) from the home position indicated with a broken line to a posture changing position indicated with a dashed line. When the wiper blade 340 and wiper arm 2 reach the posture changing position, the wiper blade 340 touches, at one end (the end far from the wiper shaft 20) thereof, a convex portion 150 formed nearly at the lower central portion of the rim 15.

When the wiper arm 20 is further rotated counterclockwise, the wiper arm 2 is moved forward by means of the wiper head 23 in the direction of arrow i (counterclockwise) from the posture changing position to a reverse position indicated with a two-dot chain line. On the other hand, since the wiper blade 340 is in contact, at the one end thereof, with the convex portion 150 of the rim 15, it is turned about the shaft 43 in the direction of arrow j (clockwise) from the posture changing position to the reverse position, that is, it is changed in posture.

When the wiper blade 340 reaches the reverse position, its one end is positioned higher than the other end so that the rainwater gathered by the wiping string 3 on the mirror surface 10 flows down along the wiping string 3 from the higher end to the lower end thereof and is discharged from the mirror unit 12. A drain port (not shown) is provided in the lower portion of the rim 15.

When the wiper blade 340 and wiper arm 2 arrive at the reverse position, the wiper shaft 20 starts rotating clockwise. Then, the wiper blade 340 and wiper arm 2, kept in the posture at the reverse position, are moved back by means of the wiper head 23 in an opposite direction (clockwise) to the directions of arrows i and g and the wiper blade 340 touches, at one end thereof, the inner circumference of the rim 15 at the home position.

When the wiper shaft 20 is further rotated clockwise, the wiper arm 2 is moved back by means of the wiper head 23 in an opposite direction (clockwise) to the directions of arrows i and g to the home position. On the other hand, since the wiper blade 340 is in contact, at the one end thereof, with the rim 15 at the home position, it is turned about the shaft 43 in the direction of arrow j (counterclockwise) to the home position, namely, it is changed in posture.

When the wiper blade 340 and wiper arm 2 reach the home position, the wiper shall 20 is stopped from rotating. The wiper blade 340 and wiper arm 2 kept generally in line with each other are received into the penthouse-like overhanging portion 17. At this time, the rainwater gathered by the wiper blade 340 over the mirror surface 10 is discharged from the mirror unit 12 through drain holes 161.

As in the above, the wiper blade 340 is reciprocally moved between the home position and reverse position to wipe away raindrops or dust on the mirror surface. Since the wiper blade 340 is changed posture in the course of reciprocal wiping motion thereof, it snakes on a generally S-like way, thus permitting to effectively sweep a wide area of the mirror surface 10.

Figure 29:
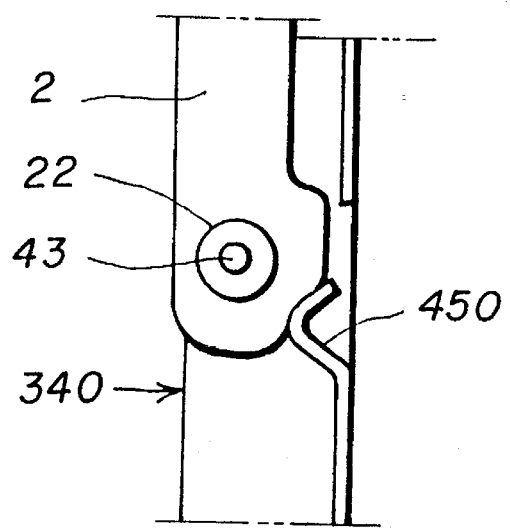
FIG. 29 is a partial front view showing the means of keeping the wiper blade and arm in line with each other.

While the wiper blade 340 and wiper arm 2 are being moved forward from the home position to the posture changing position, they should be kept nearly in line with each other. To keep them generally in line with each other, there may be used a resilient member 450, for example, provided on the wiper blade 340 as shown in FIG. 29 and adapted to resiliently abut the wiper arm 2, a weight provided on the wiper blade 340, a means of balancing the wiper blade 340 when it is moved forward on the mirror surface, or the like.

The wiper head 23 has provided thereon an resilient member (not shown) which forces the wiper blade 340 to the mirror surface 10 by means of the wiper arm 2.

As shown in FIG. 23, the wiper according to the present invention has a wiper blade guide formed nearly at the right center of the rim 15 of the mirror holder 11 of the mirror unit 12. In Figure, the reference numerals 151, 152 and 153 indicate an ascending slope, vertical wall and a stopper, respectively, composing the wiper blade guide.

Figures 28A, 28B:
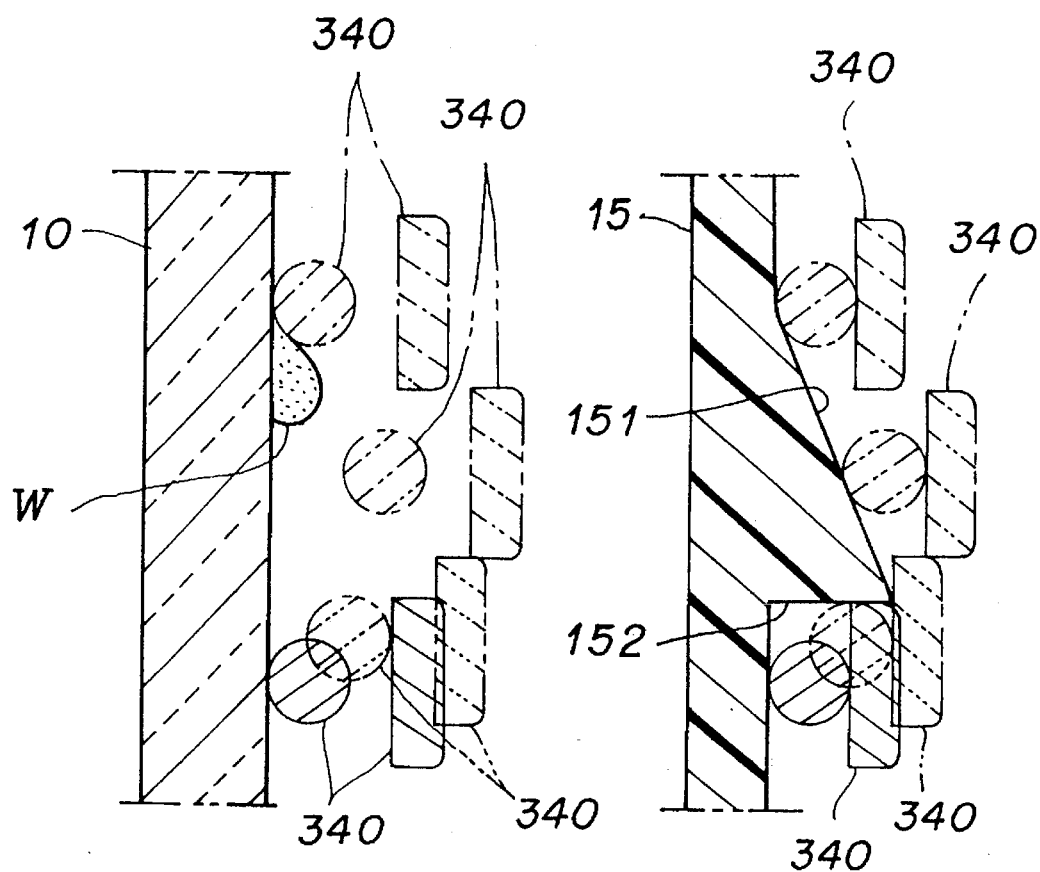
FIG. 28A is a sectional view taken along the line XXVIIIA—XXVIIIA in FIG. 27.
FIG. 28B is a sectional view taken along the line XXVIIIB—XXVIIIB in FIG. 27.

The ascending slope 151 is destined to lift away from the mirror surface 10 the wiper blade 340 having been moved to near its reverse position. As shown in FIG. 28B, the end of the wiper blade 340 near the wiper shaft 20 is moved up along the ascending slope 151.

The vertical wall 152 is intended to move down or lower the wiper blade 340 from the lifted position above the mirror surface 10 to a predetermined position on the mirror surface 10. As shown in FIG. 28B, the wiper blade 340 having been moved along the ascending slope 151 is guided at the end thereof to the predetermined position on the mirror surface 10.

The stopper 153 is provided to stop the wiper blade 340 from the forward motion at the reverse position. It is a vertical wall or a projection.

Figure 27:
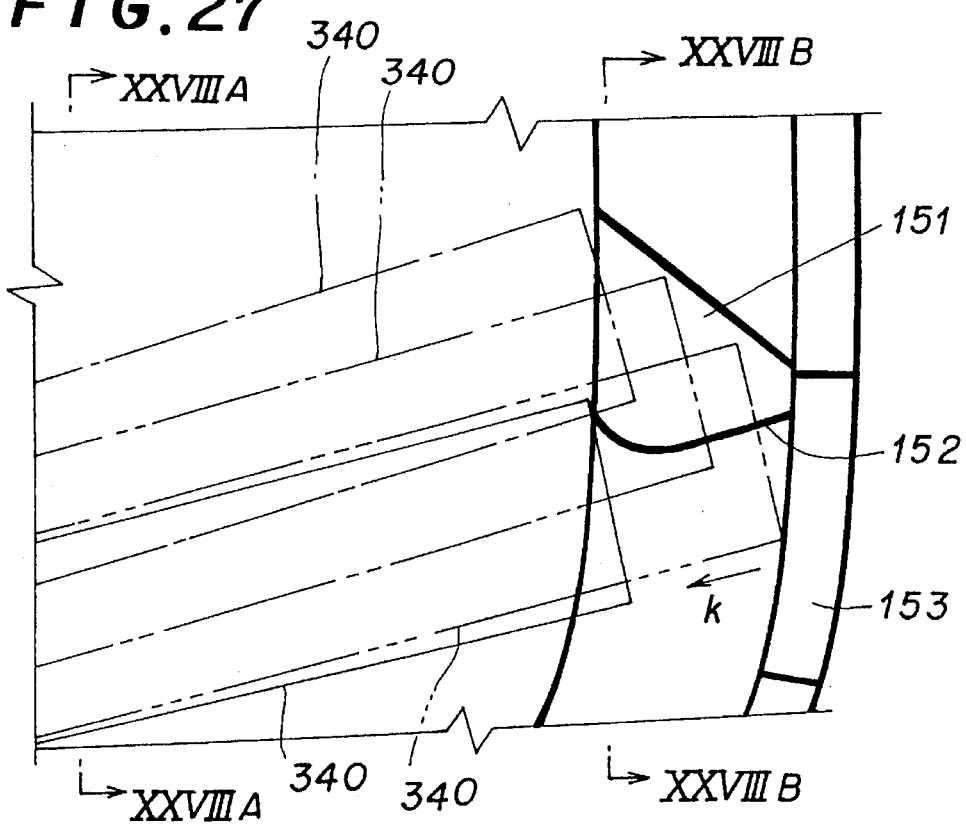
FIG. 27 is an explanatory drawing showing the function of the wiper blade guide on the rim.

The ascending slope 151, vertical wall 152 and stopper 153 function as will be described below with reference to FIG. 27 and FIGS. 28A and 28B. In these Figures, the dashed line indicates the wiper blade 340 having been moved to near its reverse position, the two-dot chain line indicates the wiper blade 340 being lifted off the mirror surface 10, the three-dot chain line indicates the wiper blade 340 having arrived at the reverse position, and the thin line indicates the wiper blade 340 having landed on the mirror surface 10.

First, as indicated with the two-dot chain line in FIG. 23, the wiper blade 340 is moved counterclockwise along with the wiper arm 2 while rotating clockwise. With this forward stroke, the wiping string 3 of the wiper blade 340 wipe away raindrops W on the mirror surface 10.

When the wiper blade 340 comes to near the reverse position, its end near the wiper shaft 20 is moved along the ascending slope 151. Namely, the wiper blade 340 starts being lifted off the mirror surface 10.

At this time, since this end of the wiper blade 340, lifted off the mirror surface 10, is higher than the other end, the rainwater will smoothly fall down along the wiping string 3 from the higher end to the lower end.

When the wiper blade 340 further moves and comes to the reverse position, the higher end thereof touches the stopper 153 and the wiper blade 340 will stop moving forward. Also the wiping string 3 abuts the vertical wall 152 and the string fixture 420 of the blade lever 400 is at the top of the ascending slope 151. So the end of the wiper blade 340, near the wiper shape 20, is off the mirror surface 10.

The wiping string 3 of the wiper blade 340 is off the mirror surface 10 and then jumps over the rainwater W.

When the wiper blade 340 has reached the reverse position, the wiper shaft 20 starts rotating clockwise and thus the wiper blade 340 starts being moved back. At this time, however, the wiping string 3 of the wiper blade 340 is in contact with the vertical wall 152. As a result, the wiper blade 340 does not retrace the aforementioned forward stroke, namely, it does not move from the position indicated with three-dot chain line to the position indicated with the dashed line through the position indicated with the two-dot chain line, but it will be moved in the direction of arrow k in FIG. 27 as guided by the vertical wall 152. When the string fixture 420 of the blade lever 400 of the wiper blade 340 leaves the top of the ascending slope 151, the wiper blade 340 will land on the mirror surface 10.

The wiper blade 340 (indicated with the thin line) will land onto the mirror surface 10 to the reverse position of the wiper blade 340, indicated with the three-dot chain line, rather than to the lifted position indicated with the dashed line. Thus, the wiping string 3 of the wiper blade 340 is lifted off the mirror surface 10 and can positively jump over the rainwater W. As indicated with the dashed line in FIG. 28A, therefore, the wiping string 3 of the wiper blade 340 can positively wipe away raindrops on the mirror surface since the wiper blade 340 jumps over the rainwater W it has gathered by its forward movement and wipes it again along with new raindrops by its reverse movement with no trailing, during the reverse movement, of the rainwater having been gathered downward once by the forward movement and which will spoil the sight of the mirror surface 10 once cleaned.

When the wiper blade 340 has landed on the mirror surface 10, it will start the reverse stroke to the home position. In the home position, the rainwater W gathered by the wiping string 3 is discharged out of the mirror unit 12 through the drain holes 161.

In the aforementioned embodiment, the ascending slope 151 and vertical wall 152 act on the one end of the wiper blade 340 (positioned higher than the other end when the wiper blade 3 is at the reverse position). However, the present invention is not limited only to this configuration. They may be adapted for action upon both ends or the other end (far from the wiper shaft 20) of the wiper blade 340.

Further, the ascending slope 151 may be formed as an ascending recess and the vertical slope as a guide recess while the wiper blade 340 may have formed thereon a projection which is to be engaged in such recesses.

Also the present invention may be so adapted that the majority, not the entirety, of the wiper blade jumps over the rainwater gathered by its forward movement.

What is claimed is:

1. A wiper assembly adapted for use on an automotive outside mirror, said outside mirror having a mirror unit including a mirror body, a reflecting surface, a mirror holder, and a mirror housing in which the mirror unit is installed, the wiper assembly comprising:

a drive unit provided inside the mirror housing, a wiper arm connected to the drive unit, and a wiper blade reciprocally movable on the reflecting surface of the mirror body by the wiper arm driven by the drive unit, said wiper blade comprising a blade lever adapted to be disposed substantially parallel with the reflecting surface, and coupled to the wiper arm, said blade lever having a thickness and two opposite sides, said blade lever comprising an elongated rigid body having string fixtures at both ends, said string fixtures extending substantially parallel to said rigid body, each fixture defining a planar surface;

a wiping string having first and second end portions and being held extended along one side of said blade lever, said end portions being coupled to said string fixtures and said wiping string contacting said planar surfaces; and wherein said wiping string is adapted to engage the reflecting surface to wipe away raindrops therefrom.

2. A wiper assembly as set forth in claim 1, wherein the blade lever has a rigid body and two ends, each end being terminated by a string fixture, each of the string fixtures having a string receiving recess formed therein, and the wiping string has two ends and a retainer provided on each end thereof, the wiping string being held in an extended orientation along one side of the blade lever by the retainers which are disposed on the opposite side of the blade lever adjacent the recesses.

3. A wiper assembly as set forth in claim 1, wherein the blade lever has a rigid body and two ends, each end being terminated by a string fixture, the blade lever further including at least one vertical projection integrally formed with at least one of the string fixtures, and string receiving recesses formed in each of the string fixtures, and the wiping string has two ends and a retainer provided on each end thereof, the wiping string being held in an extended orientation along one side of the blade lever by the retainers which are disposed adjacent the recesses of the blade lever.

4. A wiper assembly as set forth in claim 1, wherein the blade lever is generally rectangular.

5. A wiper blade assembly adapted to be reciprocally moved on a reflecting surface of an automotive mirror body, said assembly comprising:

a wiper arm;

a blade lever coupled to the wiper arm, said blade lever having two opposite sides, the blade lever having a rigid body and two ends, each end being terminated by a string fixture, each of the string fixtures having a string receiving recess formed therein; and a wiping string extending along one side of the blade lever, the wiping string having two ends and a retainer provided on each end thereof, the wiping string being held in an extended orientation against one side of the blade lever by the retainers, the retainers being disposed on the opposite side of the blade lever adjacent the recesses; and a compression coil spring fitted on the wiping string and located between one of the string receiving recesses in the blade lever and one of the retainers on the wiping string to tension the wiping string.

6. A wiper blade assembly adapted to be reciprocally moved on a reflecting surface of an automotive mirror body, said assembly comprising:

a wiper arm;

a blade lever coupled to the wiper arm, said blade lever having a rigid body, two opposite sides, and two ends, each end being terminated by a string fixture, the blade lever further including at least one vertical projection integrally formed with at least one of the string fixtures, the blade lever further including string receiving recesses formed in each of the string fixtures, a wiping string having two ends and a retainer provided on each end thereof, the wiping string being held in an extended orientation along one side of the blade lever by the retainers, the retainers being disposed adjacent the recesses of the blade lever, and a compression coil spring fitted on the wiping string and located between the vertical projection of the blade lever and one of the retainers on the wiping string to tension the wiping string.

7. A wiper blade assembly adapted to be reciprocally moved on a reflecting surface of a mirror body, said assembly comprising:

a wiper arm;

a blade lever coupled to the wiper arm, said blade lever having two opposite sides and two opposite ends; and a wiping string having two ends extending along one side of the blade lever, wherein the blade lever has a rigid body terminated by a string fixture on each end thereof, said blade lever further comprising a member rotatably mounted to at least one of the string fixtures at one end of the blade lever, a means for locking the rotatable member from rotating, and string receiving recesses formed in both the rotatable member and the string fixture at the opposite end of the blade lever, and wherein the wiping string has a retainer provided on each end thereof and the wiping string is held in an extended orientation along one side of the blade lever by the retainers, which are disposed adjacent the string receiving recesses provided in the rotatable member, and the string fixture at the opposite end of the blade lever, and the rotatable member, which is locked by the locking means.

8. A wiper blade assembly adapted to be reciprocally moved on a reflecting surface of a mirror body, said assembly comprising:

a wiper arm;

a blade lever coupled to the wiper arm, said blade lever having two opposite sides and two opposite ends;

a wiping string having two ends extending along one side of the blade lever, wherein the blade lever has a rigid body terminated by a string fixture on each end thereof, a leaf spring fixed to one of the string fixtures, and a string receiving recess formed in each of the leaf spring and the string fixture at the opposite end the blade lever, and wherein the wiping string has a retainer provided on each end thereof and is held in an extended orientation along one side of the blade lever by the retainers, said retainers being disposed adjacent the recesses provided in the leaf spring and the string fixture at the opposite end of the blade lever.

9. A wiper blade assembly adapted to be reciprocally moved on a reflecting surface of a mirror body, said assembly comprising:

a wiper arm;

a blade lever coupled to the wiper arm, said blade lever having two opposite sides and two opposite ends;

a wiping string having two ends extending along one side of the blade lever, wherein the blade lever has a rigid body terminated by a string fixture on each end thereof, a leaf spring fixed to one of the string fixtures, and a string receiving recess formed in each of the string fixtures, and wherein the wiping string has a retainer provided on each end thereof and is held in an extended orientation along one side of the blade lever by the retainers, which are disposed adjacent the string receiving recesses provided in the blade lever.

10. A wiper and automotive outside mirror assembly comprising:

a mirror unit including a mirror body having a reflecting surface and a mirror holder, a mirror housing in which the mirror unit is installed, a drive unit provided inside the mirror housing;

a wiper arm connected to the drive unit; and an elongated wiper blade which is reciprocally moved on the reflecting surface of the mirror body between a home and reverse position by the wiper arm driven by the drive unit; the wiper blade comprising a blade lever coupled to the wiper arm and a wiping string held in an extended orientation along one side of the blade lever to wipe away raindrops on the reflecting surface;

the mirror holder having formed thereon a wiper blade guide consisting of a means of lifting the wiper blade which is near the reverse position away from the reflecting surface and a means of landing the wiper blade, from the lifted position above the reflecting surface onto the reflecting surface at a predetermined position.

11. A wiper and automotive outside mirror assembly as set forth in claim 10, wherein the lifting means is an ascending slope along which the wiper blade is adapted to be moved at one end thereof until the end of the wiper blade is lifted off the surface, and the landing means is a vertical wall along which the end of the wiper blade, which previously has been moved along the ascending slope, is adapted to be guided to land on the reflecting surface at the predetermined position.

12. A wiper and automotive outside mirror assembly as set forth in claims 11, wherein drain holes are formed in the mirror holder at the home position through which rainwater gathered by the wiper blade is discharged from the mirror unit.

13. A wiper and automotive outside mirror assembly as set forth in claim 10, wherein drain holes are formed in the mirror holder at the home position through which rainwater gathered by the wiper blade is discharged from the mirror unit.

14. A wiper blade assembly adapted to be reciprocally moved on a reflecting surface of an automotive mirror body, said assembly comprising:

a wiper arm;

a blade lever coupled to the wiper arm, said blade lever having an elongated rigid body, two opposite sides, and two opposite ends, each end being terminated by a string fixture, each of the string fixtures having a string receiving recess formed therein, said string fixtures extending substantially parallel to said rigid body, each fixture defining a planar surface; and a wiping string having two ends and a retainer provided on each end thereof, each retainer having a width that is greater than a width of each of the string receiving recesses, the wiping string being held in an extended orientation along one side of the blade lever by the retainers, which are disposed on the opposite side of the blade lever adjacent the recesses, said ends of said wiping string being coupled to said string fixtures and said wiping string contacting said planar surfaces; and wherein said wiping string is adapted to engage the reflecting surface to wipe away raindrops therefrom.

15. A wiper blade assembly of claim 14, wherein the outside diameter of the wiping string ranges from 0.7 to 1.0 inches.

* * * * *